United States Patent
Miller

(10) Patent No.: US 11,633,744 B2
(45) Date of Patent: Apr. 25, 2023

(54) MAGNETIC LJUNGSTROM FILTER

(71) Applicant: Air Liquide Large Industries U.S. LP, Houston, TX (US)

(72) Inventor: Gary D. Miller, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 302 days.

(21) Appl. No.: 16/987,663

(22) Filed: Aug. 7, 2020

(65) Prior Publication Data
US 2022/0040705 A1  Feb. 10, 2022

(51) Int. Cl.
| | |
|---|---|
| *B03C 1/032* | (2006.01) |
| *F23J 15/02* | (2006.01) |
| *F23L 15/02* | (2006.01) |
| *B03C 1/033* | (2006.01) |
| *B03C 1/12* | (2006.01) |
| *F23L 15/04* | (2006.01) |
| *B03C 1/30* | (2006.01) |
| *B03C 1/28* | (2006.01) |

(52) U.S. Cl.
CPC ............... *B03C 1/12* (2013.01); *B03C 1/284* (2013.01); *B03C 1/30* (2013.01); *F23L 15/04* (2013.01); *B03C 2201/20* (2013.01)

(58) Field of Classification Search
CPC ....... B03C 1/12; B03C 1/284; B03C 2201/20; B03C 1/30
See application file for complete search history.

(56) References Cited

U.S. PATENT DOCUMENTS

| | | | | |
|---|---|---|---|---|
| 5,019,272 A | * | 5/1991 | Kurahashi | B03C 1/0332 210/695 |
| 5,932,096 A | * | 8/1999 | Saho | B03C 1/027 210/208 |
| 10,543,622 B2 | * | 1/2020 | Fairweather | B24B 27/065 |
| 10,690,354 B2 | * | 6/2020 | Klein | B01D 53/86 |
| 2020/0016522 A1 | * | 1/2020 | Pepper | B01D 46/70 |

* cited by examiner

*Primary Examiner* — Charles A Fox
*Assistant Examiner* — Miraj T. Patel
(74) *Attorney, Agent, or Firm* — Elwood L. Haynes

(57) ABSTRACT

A heat exchange apparatus for removing magnetic particulates from a gas stream, including a rotating element basket having a regenerative heat exchanger and at least one magnetic element. A method of removing magnetic particulates from a gas stream, including heating the regenerative heat exchanger during a first portion of a cycle as a segment of the rotating element basket passes through a first zone wherein contact is made with a flue gas thereby accumulating any magnetic particulates as they are attached to the magnetic element. Then cleaning a portion of the magnetic element during a second portion of the cycle. And cooling the regenerative heat exchanger and simultaneously heating an inlet air stream during a third portion of the cycle as the segment of the rotating element basket passes through a third zone wherein fluidic contact is made with the air inlet stream.

8 Claims, 8 Drawing Sheets

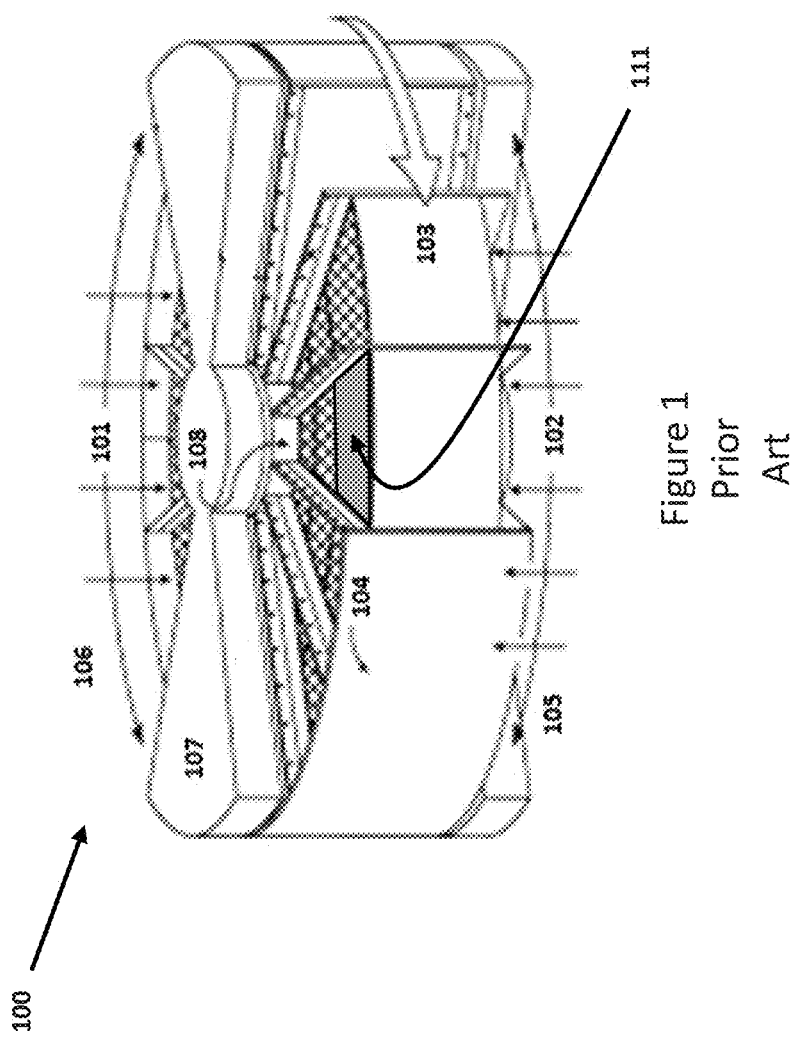

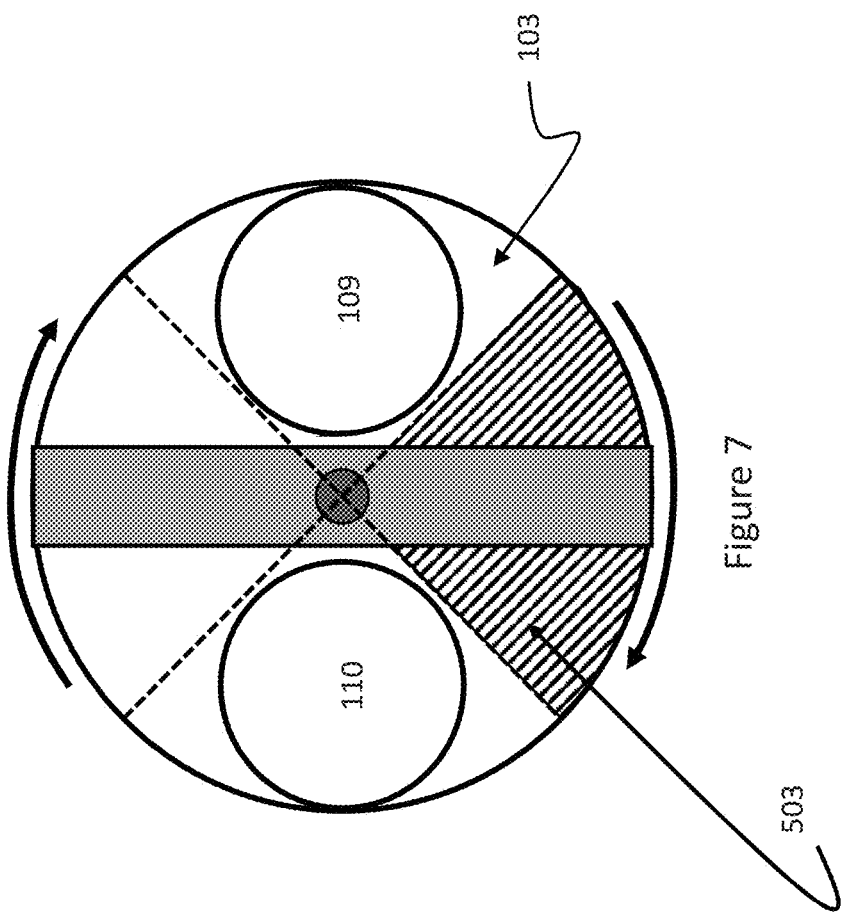
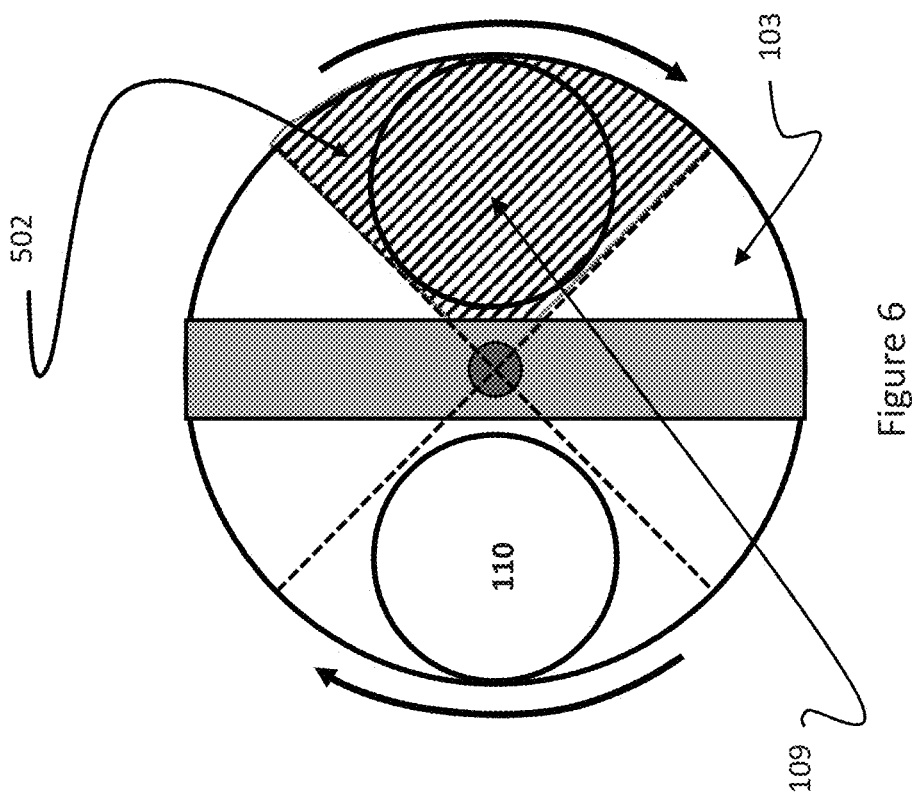

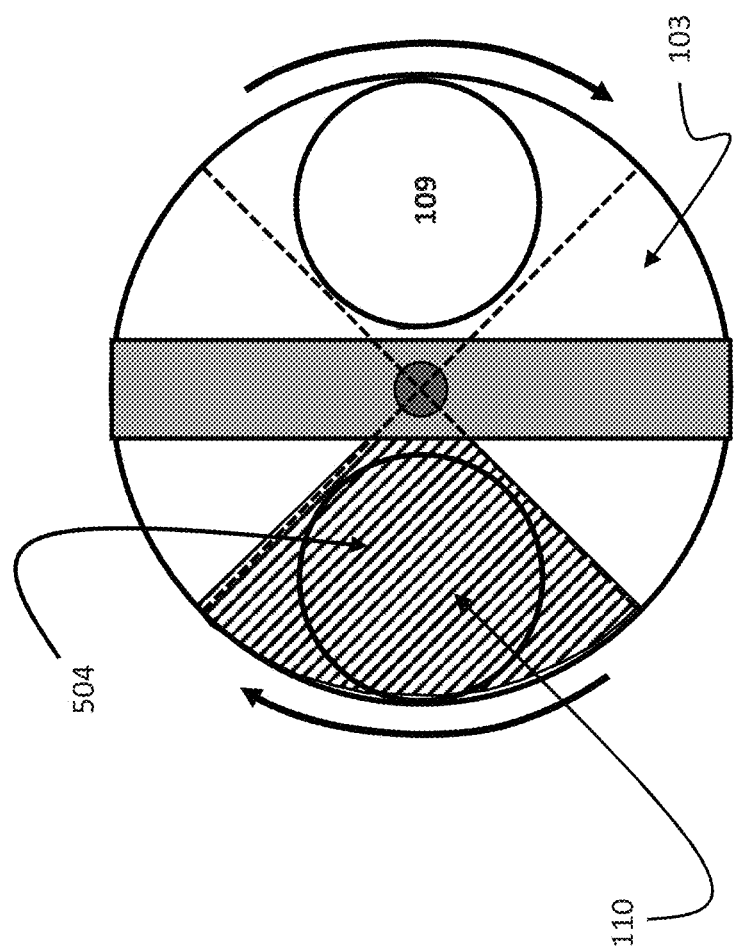

MAGNETIC LJUNGSTROM FILTER

BACKGROUND

Ljungstrom heaters are sometimes used in some boilers to transfer heat from hotter flue gas to colder incoming combustion air. As indicated in FIG. 1, a Ljungstrom heater 100 is a slowly rotating metal disc or body 103 that has channels 111 passing through it. It is through these channels or segments 111 which the flowing gaseous streams flow. The hotter flue gas 101 passes through the channels on one side of the rotating disk 106, and transfer heat to the metal body. This portion of the heater is referred to as the hot end 106. The colder combustion air 102 passes through channels on the other side of the rotating disk 105 and pick up heat from the metal disk. This portion of the heater is known as the cold end 105. When the disk rotates, it moves the hotter section toward the combustion air, and rotates the cooler section toward the flue gas.

Fundamentally, in the center of element basket 103 is a rotor 108 that is attached to a stationary sector plate 107. Surrounding element basket 103 is a rotor shell 104, which typically has means for sealing element basket 103 against sector plate 107 for improved heat exchange.

In some applications, in particular those in the steelmaking industry, there is often considerable amounts of ferrous or other magnetic particulate in the flue gas. It is proposed to magnetize segments 111 to aid in removing at least a portion of these ferrous or other magnetic particulates with a Ljungstrom-style heat exchanger.

SUMMARY

A heat exchange apparatus for removing magnetic particulates from a gas stream, including a rotating element basket comprising a regenerative heat exchanger and at least one magnetic element.

A method of removing magnetic particulates from a gas stream. The system includes a rotating element basket having a regenerative heat exchanger and at least one magnetic element. The method includes heating the regenerative heat exchanger during a first portion of a cycle as a segment of the rotating element basket passes through a first zone wherein fluidic contact is made with a flue gas stream thereby accumulating at least a portion of any magnetic particulates present therein as they are attached to the at least one magnetic element. Then cleaning at least a portion of the at least one magnetic element during a second portion of the cycle as the segment of the rotating element basket passes through a second zone. And cooling the regenerative heat exchanger and simultaneously heating an inlet air stream during a third portion of the cycle as the segment of the rotating element basket passes through a third zone wherein fluidic contact is made with the air inlet stream.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein:

FIG. 1 is a schematic representation of a basic Ljungstrom heater as known in the art.

FIG. 6 is a is a modification of FIG. 2, illustrating possible locations for sectors, in accordance with one embodiment of the present invention.

FIG. 7 is a modification of FIG. 2, illustrating possible locations for sectors, in accordance with one embodiment of the present invention.

FIG. 8 is a modification of FIG. 2, illustrating possible locations for sectors, in accordance with one embodiment of the present invention.

ELEMENT NUMBERS

Figure 3:
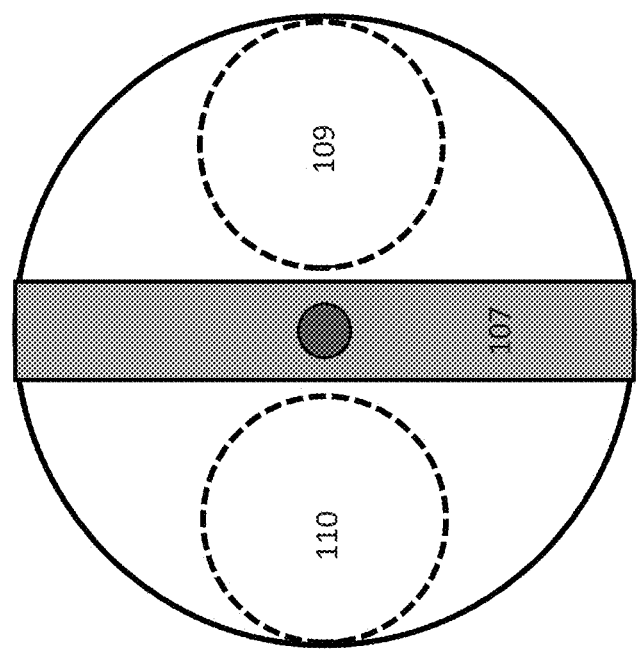
FIG. 3 is a modification of FIG. 2, illustrating possible locations for conduits, in accordance with one embodiment of the present invention.

101=Flue gas in (hot gas)
102=Air In (cool gas)
103=Element Basket
104=Rotor Shell
105=Cold End
106=Hot End
107=Sector Plate
108=Rotor
109=Flue Gas Conduit
110=Air Inlet Conduit
111=segment
401=first zone where magnet may be cleaned (first embodiment)
402=second zone where magnet may be cleaned (first embodiment)
501=sector with magnet clean and element basket cool (first embodiment)
502=sector with magnet collecting particles and element basket heating (first embodiment)
503=sector with magnet dirty and being cleaned and element basket hot (first embodiment)
504=sector with magnet at least partially cleaned and element basket cooling (first embodiment)
601=zone where magnet may be cleaned (first embodiment)
701=sector with magnet dirty and being cleaned, and element basket hot (first embodiment)
702=sector with magnet clean and element basket cooling (first embodiment)

703=sector with magnet collecting particles and element basket heating (first embodiment)

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
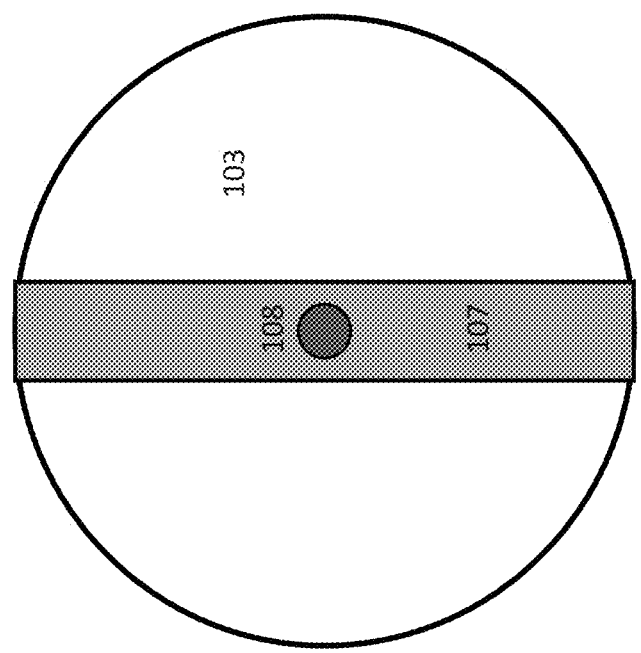
FIG. 2 is a schematic representation of a plan view of the rotor, sector plate and element basket of an apparatus in accordance with one embodiment of the present invention.
Figure 5:
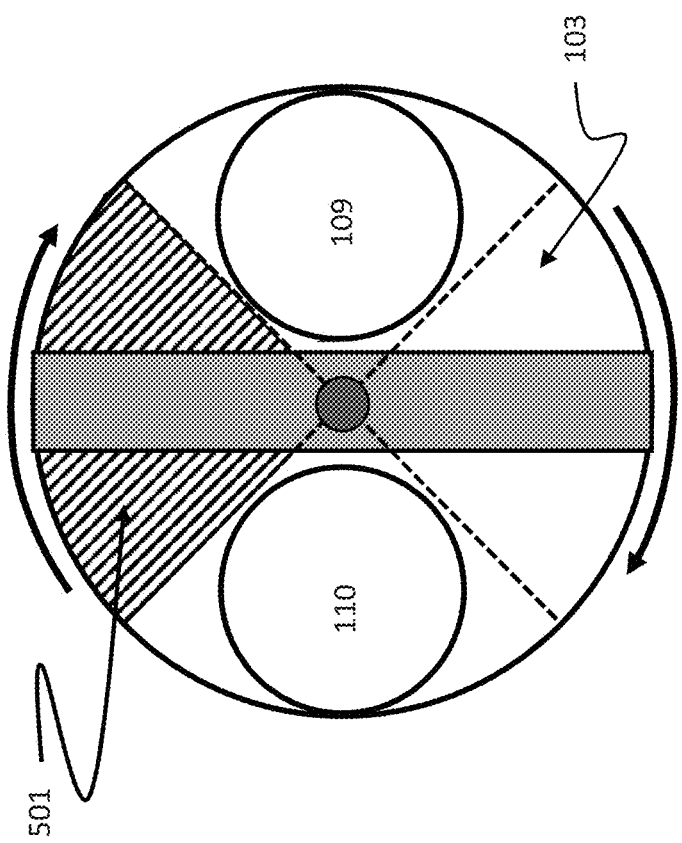
FIG. 5 is a modification of FIG. 2, illustrating possible locations for sectors, in accordance with one embodiment of the present invention.

Turning to FIG. 2, a plan view of one embodiment of the basic magnetic Ljungstrom filter is illustrated. Basket element 103 is attached to rotor 108, which is held in place by sector plate 107. Basket 103 comprises a heat transfer matrix that is fabricated from ferrous or magnetic material. This ferrous or magnetic material can be magnetized with an electrical current. FIG. 3 enhances this plan view by illustrating one possible set of locations for flue gas conduit 109 and air inlet conduit 110. Note, these channels are shown as circular, but they may be circular or any other shape.

Figure 4:
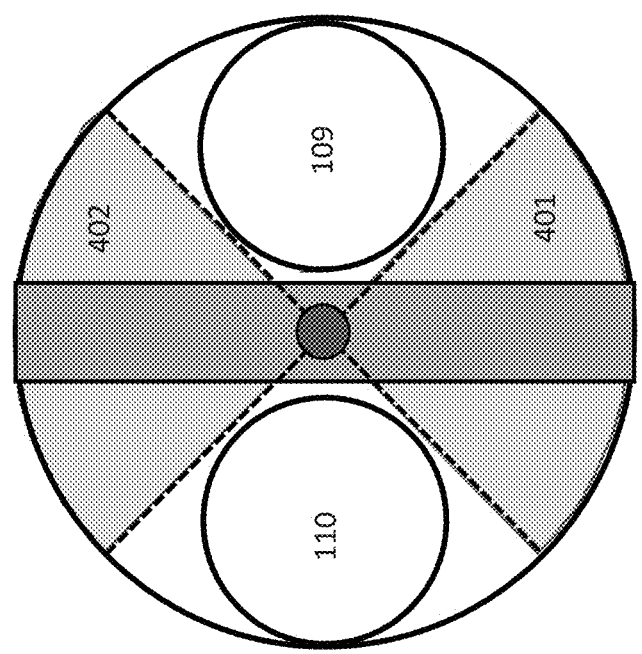
FIG. 4 is a modification of FIG. 2, illustrating possible locations for zones wherein the magnets may be cleaned, in accordance with one embodiment of the present invention.

As indicated in FIG. 4, this embodiment presents two zones 401, 402 where the magnets may be cleaned. As illustrated in FIGS. 5-8, element basket 103 can be understood as having four sectors and is rotating in a clockwise direction as indicated by the arrows. One skilled in the art would recognize that this rotation may also be in the counterclockwise direction if desired.

Sector 501 represents in general the portion of element basket 103 that is passing through zone 402. This portion of element basket 103 has just passed through air inlet conduit 110, wherein it transferred heat to the air stream and consequently cooled itself. This is a zone where any captured ferrous or other magnetic particles may be removed from magnetized element basket 103 for cleaning, particulate collection, and particulate disposal. In general sector 501 represents the portion of element basket 103 that is relatively cool and leaving with an at least partially cleaned magnet. The filter element can be cleaned mechanically (e.g. by using brushes), pneumatically (by blowing and/or vacuuming air), hydraulically (by washing with water or another fluid), or acoustically (e.g. by using sonic horns) with a force that is greater than the magnetic force applied to the rotating element. The particulates may then be removed by gravity or carried away by the flowing pneumatic or hydraulic fluid.

Sector 502 represents in general the portion of element basket 103 that is passing through flue gas conduit 109 and is collecting ferrous or other magnetic particles and wherein the regenerative heat exchanger is heated. Sector 503 represents in general the portion of element basket 103 that is passing through zone 401. This is a zone where any captured ferrous or other magnetic particles may be removed from magnetized element basket 103 for collection and disposal. In general sector 503 represents the portion of element basket 103 that is relatively hot and leaving with an at least partially cleaned magnet.

Sector 504 represents in general the portion of element basket 103 that is passing through air inlet conduit 110, wherein it transfers heat to the air stream and consequently cools itself. Then, as element basket 103 continues rotating, it returns to sector 501 as described above. Thus, element basket accomplishes two simultaneous functions. It transfers useful heat from flue gas conduit 109 to air inlet conduit 110. It also magnetically filters at least a portion of any ferrous or other magnetic particles that may have been in flue gas conduit 109, then collects them for disposal.

Figure 9:
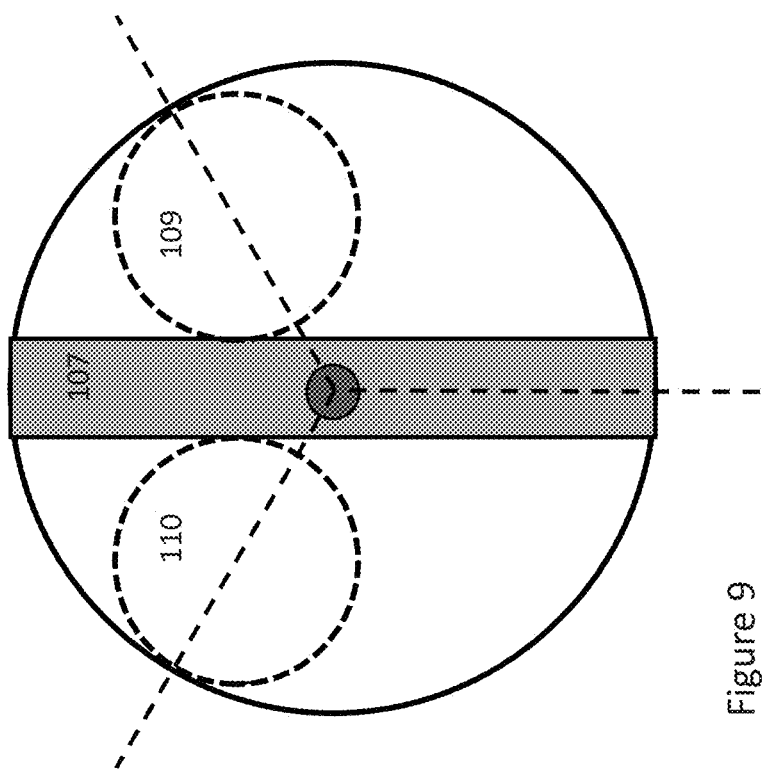
FIG. 9 is an alteration of FIG. 2, illustrating possible locations for conduits, in accordance with one embodiment of the present invention.
Figure 12:
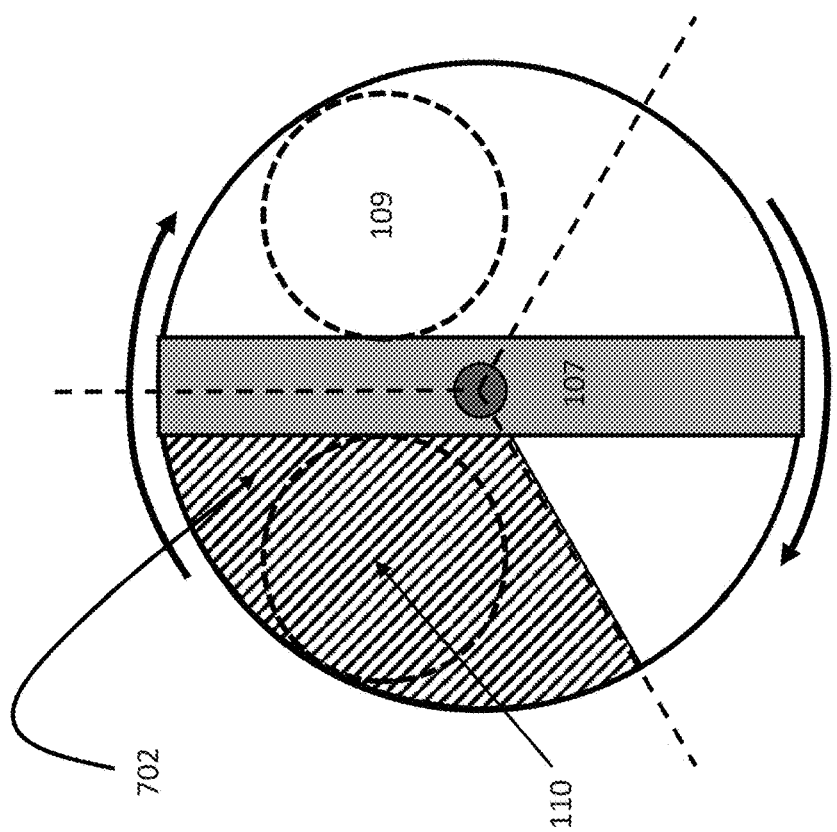
FIG. 12 is a modification of FIG. 9, illustrating possible locations for sectors, in accordance with one embodiment of the present invention
Figure 11:
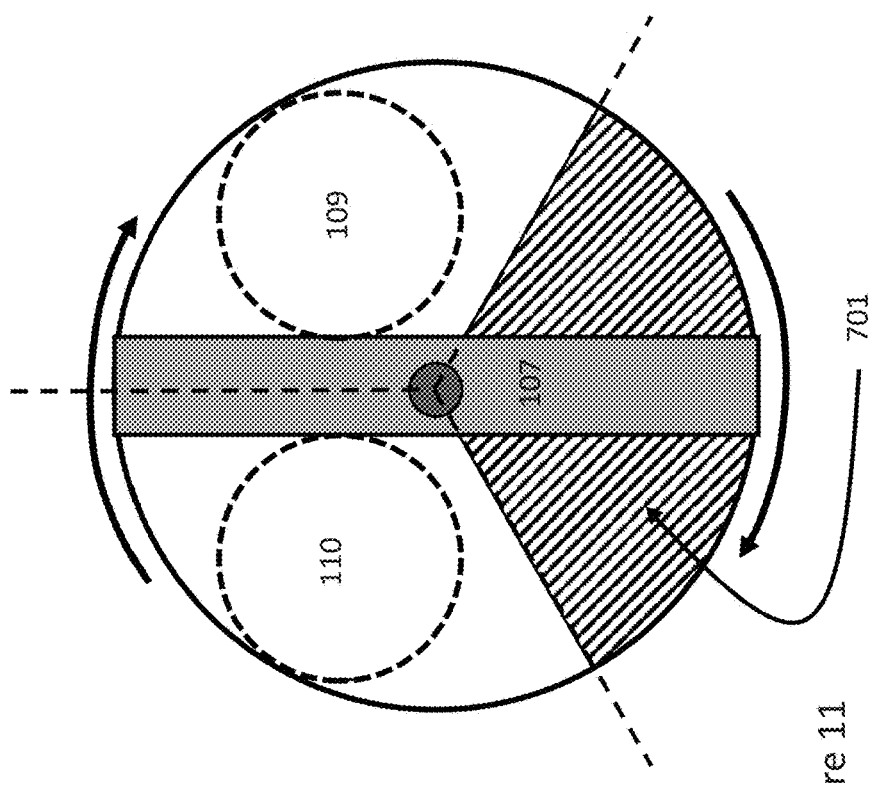
FIG. 11 is a modification of FIG. 9, illustrating possible locations for sectors, in accordance with one embodiment of the present invention.
Figure 13:
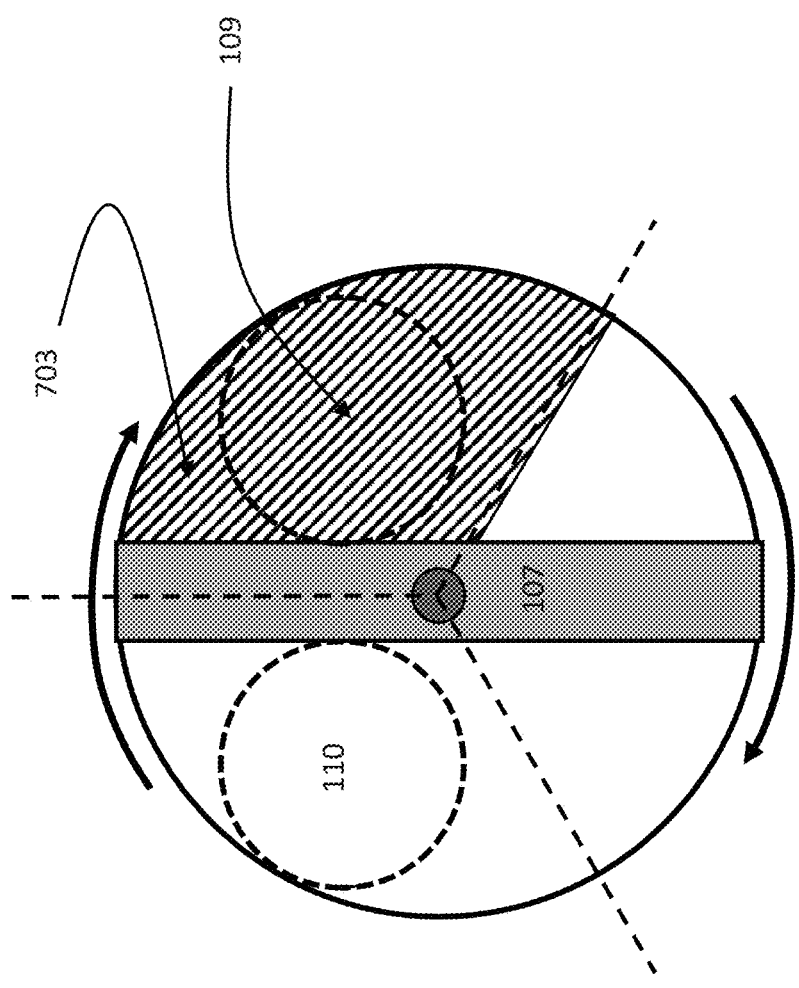
FIG. 13 is a modification of FIG. 9, illustrating possible locations for sectors, in accordance with one embodiment of the present invention

Turning to FIG. 9, a plan view of another embodiment of the basic magnetic Ljungstrom filter is illustrated. Basket element 103 is attached to rotor 108, which is held in place by sector plate 107. Basket 103 comprises a heat transfer matrix that is fabricated from ferrous or magnetic material. This ferrous or magnetic material can be magnetized with an electrical current. This view illustrates another possible set of locations for flue gas conduit 109 and air inlet conduit 110.

Figure 10:
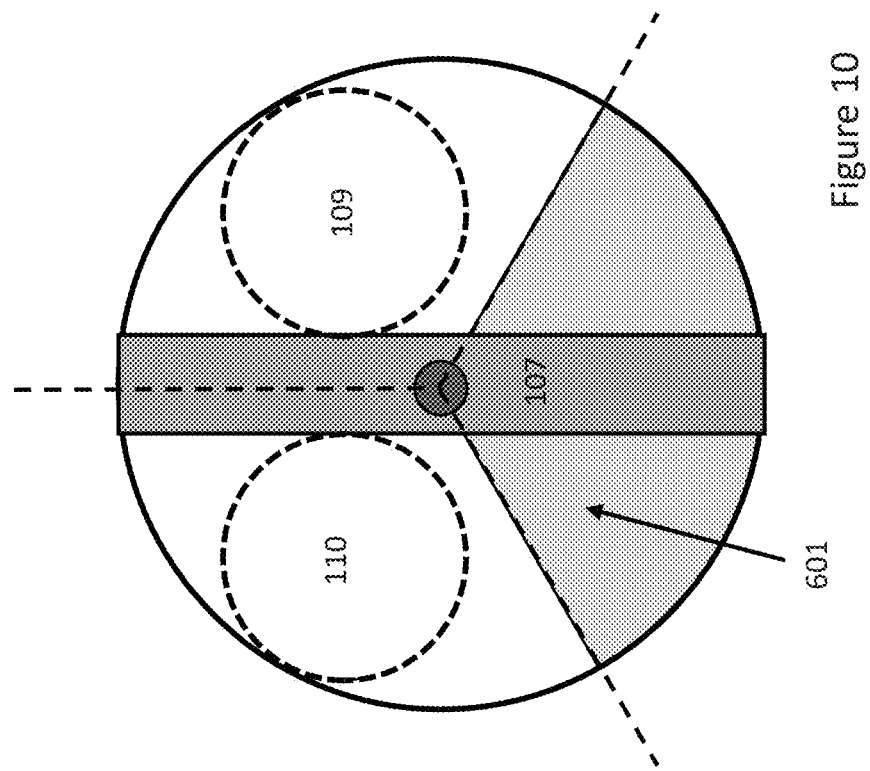
FIG. 10 is a modification of FIG. 9, illustrating possible locations for zones wherein the magnets may be cleaned, in accordance with one embodiment of the present invention.

As indicated in FIG. 10, this embodiment presents a single zone 601 where the magnets may be cleaned. As illustrated in FIGS. 11-14, element basket 103 can be understood as having three sectors and is rotating in a clockwise direction as indicated by the arrows. One skilled in the art would recognize that this rotation may also be in the counterclockwise direction if desired.

Sector 701 represents in general the portion of element basket 103 that is passing through zone 601. This portion of element basket 103 has just passed through flue gas conduit 109 and is collecting ferrous or other magnetic particles and heating. This is a zone where any captured ferrous or other magnetic particles may be removed from magnetized element basket 103 for collection and disposal. In general sector 701 represents the portion of element basket 103 that is relatively hot and leaving with an at least partially cleaned magnet.

Sector 702 represents in general the portion of element basket 103 that is passing through air inlet conduit 110, wherein it transfers heat to the air stream and consequently cools itself. Sector 703 represents in general the portion of element basket 103 that is passing through flue gas conduit 109 and is collecting ferrous or other magnetic particles and heating Then, as element basket 103 continues rotating, it returns to sector 701 as described above. Thus, element basket accomplishes two simultaneous functions. It transfers useful heat from flue gas conduit 109 to air inlet conduit 110. It also magnetically filters at least a portion of any ferrous or other magnetic particles that may have been in flue gas conduit 109, then collects them for disposal.

The means for removing any captured ferrous or other magnetic particles may be any means known in the art. Such means may include, but not be limited to, any of the following. A stream of pressurized gas may be applied to physically detach the magnetized particles from element basket 103 (not shown). Brushes may be used to physically detach the magnetized particles from element basket 103 (not shown). The brushes may be permanently attached to sector plate 107, to rotor shell 104, or anywhere else that one skilled in the art would find appropriate. The filter element can be cleaned pneumatically (by blowing and/or vacuuming air), hydraulically (by washing with water or another fluid), or acoustically (e.g. by using sonic horns) with a force that is greater than the magnetic force applied to the rotating element. The particulates may then be removed by gravity or carried away by the flowing pneumatic or hydraulic fluid.

The detached particles may fall, via gravity, into a hopper to be collected and removed (not shown). If the particles maintain are residually magnetic, the hopper may be of a non-ferrous material. The detached particles may be routed to an additional filter if needed. The detached particles may be routed to a roll-off box for disposal (not shown).

The magnetized particles may be removed by means of a vacuum (not shown). The vacuum may be produced by an educator, a blower, or any other means known in the art. These removed particles may then be routed to an additional filter if necessary or removed to a safe location for direct disposal (not shown).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A heat exchange apparatus for removing magnetic particulates from a gas stream, comprising:
   a rotating element basket comprising a regenerative heat exchanger and at least one magnetic element,
   a first zone wherein fluidic contact may be made with a flue gas stream, thereby heating the regenerative heat exchanger and accumulating at least a portion of any magnetic particulates present therein as they are attached to the at least one magnetic element,
   a second zone wherein the at least one magnetic element may be cleaned, and
   a third zone fluidic contact may be made with an air inlet stream, thereby cooling the regenerative heat exchanger and simultaneously heating the inlet air stream.

2. The apparatus of claim 1, further comprising a fourth zone the at least one magnetic element may be further cleaned.

3. The apparatus of claim 1, wherein the at least one magnetic element comprises a heat transfer matrix that is fabricated from magnetic material.

4. The apparatus of claim 1, wherein the at least one magnetic element is cleaned by one or more procedure selected from the group consisting of: mechanically, pneumatically, hydraulically, or acoustically.

5. A method of removing magnetic particulates from a gas stream, comprising a rotating element basket comprising a regenerative heat exchanger and at least one magnetic element, the method comprising:
   heating the regenerative heat exchanger during a first portion of a cycle as a segment of the rotating element basket passes through a first zone wherein fluidic contact is made with a flue gas stream thereby accumulating at least a portion of any magnetic particulates present therein as they are attached to the at least one magnetic element,
   cleaning at least a portion of the at least one magnetic element during a second portion of the cycle as the segment of the rotating element basket passes through a second zone, and
   cooling the regenerative heat exchanger and simultaneously heating an inlet air stream during a third portion of the cycle as the segment of the rotating element basket passes through a third zone wherein fluidic contact is made with the air inlet stream.

6. The method of claim 5, further comprising cleaning at least a portion of the at least one magnetic element during a fourth portion of the cycle as the segment of the rotating element basket passes through a fourth zone.

7. The method of claim 5, wherein the at least one magnetic element comprises a heat transfer matrix that is fabricated from magnetic material.

8. The method of claim 5, wherein the at least one magnetic element is cleaned by one or more procedure selected from the group consisting of: mechanically, pneumatically, hydraulically, or acoustically.

\* \* \* \* \*